(12) United States Patent
Mahajan

(10) Patent No.: US 11,390,278 B2
(45) Date of Patent: Jul. 19, 2022

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Aditya Mahajan, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 16/866,574

(22) Filed: May 5, 2020

(65) Prior Publication Data

US 2020/0384996 A1 Dec. 10, 2020

(30) Foreign Application Priority Data

May 16, 2019 (JP) .............................. JP2019-092823

(51) Int. Cl.
*B60W 30/16* (2020.01)
*B60W 40/04* (2006.01)

(52) U.S. Cl.
CPC ............ *B60W 30/16* (2013.01); *B60W 40/04* (2013.01); *B60W 2552/10* (2020.02); *B60W 2554/406* (2020.02); *B60W 2554/4041* (2020.02)

(58) Field of Classification Search
None
See application file for complete search history.

(56) References Cited

U.S. PATENT DOCUMENTS

| | | | |
|---|---|---|---|
| 9,475,491 B1* | 10/2016 | Nagasaka | B60W 30/18163 |
| 2013/0110343 A1 | 5/2013 | Ichikawa et al. | |
| 2016/0297447 A1* | 10/2016 | Suzuki | B60W 30/18163 |
| 2017/0102705 A1* | 4/2017 | Silvlin | G05D 1/0212 |
| 2017/0203690 A1* | 7/2017 | Hada | B60Q 9/008 |
| 2017/0259819 A1* | 9/2017 | Takeda | B60W 10/04 |
| 2018/0170388 A1* | 6/2018 | Shin | G05D 1/0088 |
| 2018/0204463 A1* | 7/2018 | Khalifeh | B60W 50/12 |
| 2018/0215387 A1* | 8/2018 | Takae | B60W 30/18163 |
| 2018/0215389 A1* | 8/2018 | Takae | B60W 40/08 |
| 2018/0222423 A1* | 8/2018 | Takae | B60R 21/00 |

(Continued)

FOREIGN PATENT DOCUMENTS

| JP | 2017-016200 | 1/2017 |
|---|---|---|
| JP | 2017033045 A * | 2/2017 |

(Continued)

OTHER PUBLICATIONS

Japanese Office Action for Japanese Patent Application No. 2019-092823 dated May 31, 2022.

*Primary Examiner* — David P. Merlino
(74) *Attorney, Agent, or Firm* — Amin, Turocy & Watson, LLP

(57) ABSTRACT

A vehicle control device includes: a recognizer configured to recognize a surrounding situation of a vehicle; and an action controller configured to control an action of the vehicle. The action controller determines a range in which the vehicle is located relative to a first vehicle located on a lateral side of the vehicle recognized by the recognizer and a second vehicle located on a side behind the first vehicle in a longitudinal direction of a road by the recognizer based on a distance between the first and second vehicles when a course of the vehicle is changed to the lateral side.

18 Claims, 17 Drawing Sheets

(56) References Cited

U.S. PATENT DOCUMENTS

| | | | | |
|---|---|---|---|---|
| 2018/0339708 A1* | 11/2018 | Geller | ............... | B60W 50/0097 |
| 2019/0322281 A1* | 10/2019 | Wang | ................. | G01C 21/3658 |
| 2020/0066160 A1* | 2/2020 | Mishina | ................. | G08G 1/167 |
| 2020/0094836 A1* | 3/2020 | Aoki | ................. | B60W 60/0015 |
| 2020/0108869 A1* | 4/2020 | You | ........................... | G06T 7/50 |
| 2020/0307599 A1* | 10/2020 | Oka | ................ | B60W 60/00276 |
| 2021/0269041 A1* | 9/2021 | Ito | ..................... | B60W 50/0097 |

FOREIGN PATENT DOCUMENTS

| | | |
|---|---|---|
| WO | 2011/158347 | 12/2011 |
| WO | 2017/017793 | 2/2017 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-092823, filed May 16, 2019, the content of which is incorporated herein by reference.

BACKGROUND

Field

The present invention relates to a vehicle control device, a vehicle control method, and a storage medium.

Description of Related Art

In recent years, studies of automated vehicle control have been conducted. In relation to such technology, a driving support device is known, including: an instructor that gives an instruction to start automated driving of an own vehicle through an operation of a driver; a setter that sets a destination of the automated driving; a determiner that determines a mode of the automated driving based on whether the destination is set when the driver operates the instructor; and a controller that controls vehicle traveling based on the mode of the automated driving determined by the determiner. The determiner determines the mode of the automated driving as automated stopping or automated driving in which the own vehicle travels along a current travel path when the destination is not set (see PCT International Publication No. WO 2011/158347).

However, in the technologies of the related art, travel control of a vehicle may not be performed with high precision in accordance with a surrounding situation in some cases.

SUMMARY

The present invention is devised in view of such circumstances and an objective thereof is to provide a vehicle control device, a vehicle control method, and a storage medium capable of controlling a vehicle with high precision in accordance with a surrounding situation.

A vehicle control device, a vehicle control method, and a storage medium according to the present invention adopt the following configurations.

(1) According to an aspect of the present invention, a vehicle control device includes: a recognizer configured to recognize a surrounding situation of a vehicle; and an action controller configured to control an action of the vehicle. The action controller determines a range in which the vehicle is located relative to a first vehicle located on a lateral side of the vehicle recognized by the recognizer and a second vehicle located on a side behind the first vehicle in a longitudinal direction of a road by the recognizer based on a distance between the first and second vehicles when a course of the vehicle is changed to the lateral side.

(2) In the vehicle control device according to aspect (1), the first and second vehicles may be vehicles traveling in an adjacent lane adjacent to a lane in which the vehicle is traveling in the same direction as a travel direction of the vehicle.

(3) In the vehicle control device according to aspect (1) or (2), the action controller may control a speed of the vehicle such that a part of the vehicle is included within a second range included in the first range in the longitudinal direction of the road, within a first range set between the first and second vehicles based on a distance between the first and second vehicles.

(4) In the vehicle control device according to aspect (3), the part of the vehicle may be a substantially middle of a front to rear length of the vehicle.

(5) In the vehicle control device according to aspect (3) or (4), the action controller may increase the second range in a longitudinal direction of an adjacent lane adjacent to a lane in which the vehicle is traveling as the distance between the first and second vehicles becomes longer, and may decrease a size of the second range in the longitudinal direction of the adjacent lane as the distance between the first and second vehicles becomes shorter.

(6) In the vehicle control device according to aspect (5), the action controller may cause the size of the second range in the longitudinal direction of the second range to be constant when the distance between the first and second vehicles becomes equal to or less than a first distance, and may increase the second range in the longitudinal direction as the distance becomes longer when the distance between the first and second vehicles becomes greater than the first distance.

(7) In the vehicle control device according to any one of the aspects (3) to (6), the action controller may not change the course between the first and second vehicles when the distance between the first and second vehicles becomes less than a lower limit distance for setting the first range.

(8) In the vehicle control device according to aspect (7), the action controller may change a size of the first range in the longitudinal direction based on the distance between the first and second vehicles.

(9) In the vehicle control device according to aspect (8), the action controller may cause the size of the first range in the longitudinal direction to be constant when the distance between the first and second vehicles becomes equal to or less than a second distance, and may increase the first range in the longitudinal direction as the distance becomes longer when the distance between the first and second vehicles becomes greater than the second distance.

(10) In the vehicle control device according to any one of the aspects (3) to (9), the action controller may cause a ratio between the sizes of the first and second ranges in the longitudinal direction to be substantially constant.

(11) In the vehicle control device according to any one of the aspects (3) to (10), the action controller may control the vehicle such that the vehicle is close to a middle of the second range.

(12) In the vehicle control device according to any one of the aspects (1) to (11), the action controller may predict whether the second vehicle located on a side behind an area of a lane change destination has an intention to yield the course and change a lane of the vehicle to the area when the action controller predicts that the second vehicle has the intention to yield the course.

(13) In the vehicle control device according to any one of the aspects (1) to (12), the action controller may predict whether the second vehicle located on a side behind an area of a lane change destination has an intention to yield the course, and set the second vehicle to a new first vehicle and sets a vehicle located on a side behind the second vehicle as a new second vehicle when the action controller predicts that the second vehicle has no intention to yield the course, and may control the vehicle such that a part of the vehicle is included in a first or second range set between the new first and second vehicles based on a distance between the new first and second vehicles.

(14) In the vehicle control device according to aspect (13), the action controller may change a lane without performing the prediction when a distance in the longitudinal direction from an area in which there is no vehicle on the side behind the first vehicle is equal to or greater than a standard distance.

(15) According to another aspect of the present invention, a vehicle control method, comprising: recognizing, by the computer, a surrounding situation of a vehicle; to control an action of the vehicle; and determining, by the computer, a range in which the vehicle is located relative to a first vehicle located on a lateral side of the recognized vehicle and a second vehicle located on a side behind the first vehicle in a longitudinal direction of a road based on a distance between the first and second vehicles when a course of the vehicle is changed to the lateral side.

(16) According to still another aspect of the present invention, a non-transitory computer-readable storage medium stores a computer program to be executed by a computer to perform at least: recognize a surrounding situation of a vehicle; control an action of the vehicle; and determine a range in which the vehicle is located relative to a first vehicle located on a lateral side of the recognized vehicle and a second vehicle located on a side behind the first vehicle in a longitudinal direction of a road based on a distance between the first and second vehicles when a course of the vehicle is changed to the lateral side.

According to the aspects (1) and (10) and (14) to (16), the vehicle control device controls the vehicle such that the vehicle is located within the first range at a position of a road in the longitudinal direction of the road, and thus it is possible to control the vehicle with high precision in accordance with a surrounding situation.

According to aspect (11), the vehicle control device can realize the smooth lane change.

According to aspect (12), the vehicle control device changes the lane of the vehicle to a side in front of the second vehicle predicted to have an intention to yield the course. Therefore, it is possible to inhibit the lane change which is not intended by the second vehicle.

According to aspect (13), the vehicle control device controls the vehicle such that the second vehicle predicted to have the intention to yield the course is searched for. Therefore, it is possible to realize the lane change more reliably while inhibiting the lane change which is not intended by the second vehicle.

DETAILED DESCRIPTION

Hereinafter, embodiments of a vehicle control device, a vehicle control method, and a storage medium according to the present invention will be described with reference to the drawings.

First Embodiment

[Overall Configuration]

Figure 1:
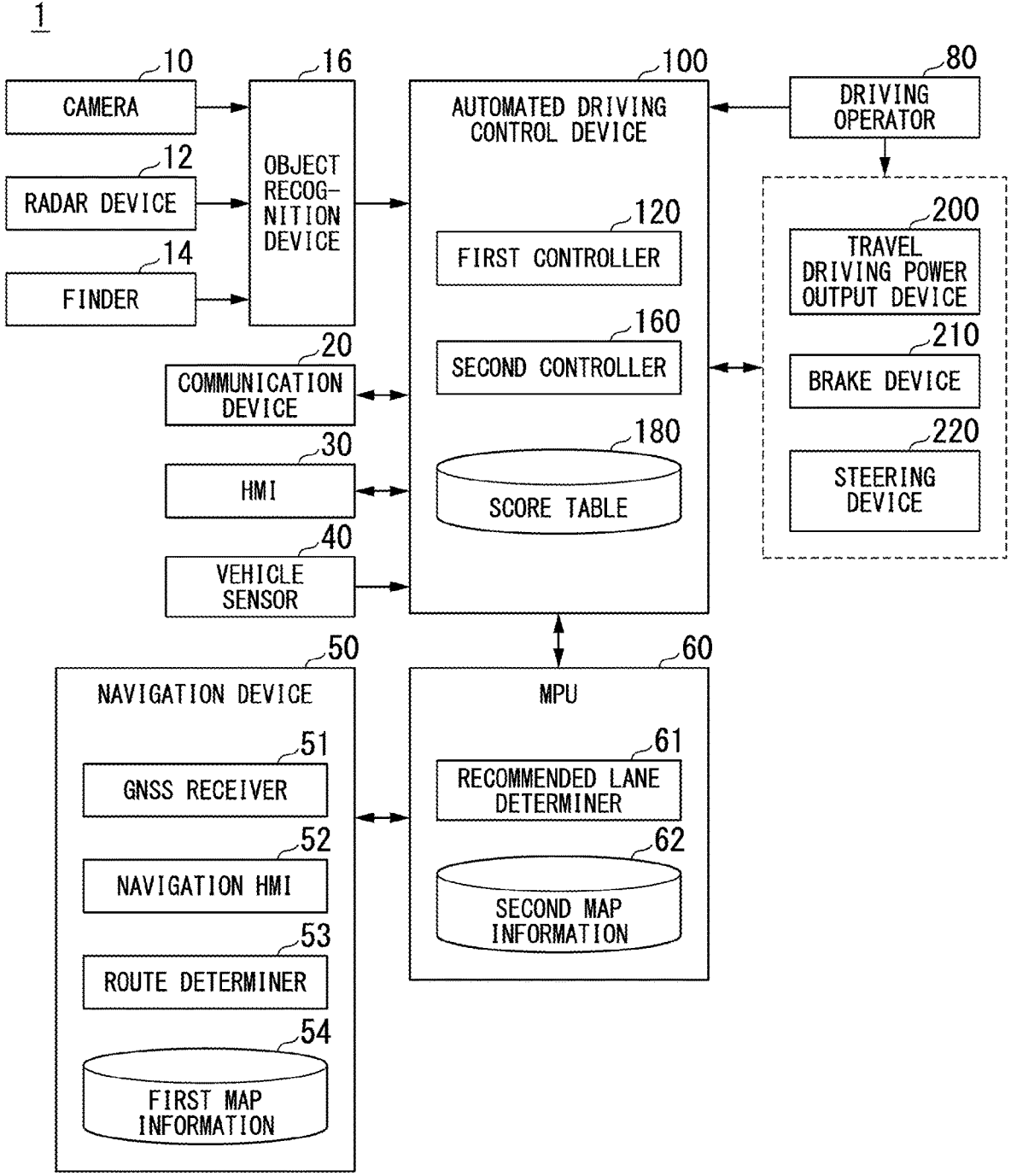
FIG. 1 is a diagram showing a configuration of a vehicle system in which a vehicle control device according to an embodiment is used.

FIG. 1 is a diagram showing a configuration of a vehicle system 1 in which a vehicle control device according to an embodiment is used. A vehicle in which the vehicle system 1 is mounted is, for example, a vehicle such as a two-wheeled vehicle, a three-wheeled vehicle, or a four-wheeled vehicle. A driving source of the vehicle includes an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charged-coupled device (CCD) or a complementary metal-oxide semiconductor (CMOS). The camera 10 is mounted on any portion of a vehicle in which the vehicle system 1 is mounted (hereinafter referred to as an own vehicle M). When the camera 10 images a front side, the camera 10 is mounted on an upper portion of a front windshield, a rear surface of a rearview mirror, or the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance from and an azimuth of) of the object. The radar device 12 is mounted on any portion of the own vehicle M. The radar device 12 may detect a position and a speed of an object in conformity with a frequency modulated continuous wave (FM-CW) scheme.

The finder 14 is a light detection and ranging (LIDAR) finder. The finder 14 radiates light to the surroundings of the own vehicle M and measures scattered light. The finder 14 detects a distance to a target based on a time from light emission to light reception. The radiated light is, for example, pulsed laser light. The finder 14 is mounted on any portions of the own vehicle M.

The object recognition device 16 performs a sensor fusion process on detection results from some or all of the camera 10, the radar device 12, and the finder 14 and recognizes a position, a type, a speed, and the like of an object. The object recognition device 16 outputs a recognition result to the automated driving control device 100. The object recognition device 16 may output detection results of the camera 10, the radar device 12, and the finder 14 to the automated driving control device 100 without any change. The object recognition device 16 may be excluded from the vehicle system 1.

The communication device 20 communicates with other vehicles around the own vehicle M using, for example, a cellular network, a Wi-Fi network, Bluetooth (registered trademark), dedicated short range communication (DSRC) or the like or communicates with various server devices via a wireless base station.

The HMI 30 presents various types of information to occupants of the own vehicle M and receives input operations by the occupants. The HMI 30 includes various display devices, speakers, buzzers, touch panels, switches, and keys.

The vehicle sensor 40 includes a vehicle speed sensor that detects a speed of the own vehicle M, an acceleration sensor that detects acceleration, a yaw rate sensor that detects angular velocity around a vertical axis, and an azimuth sensor that detects a direction of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 specifies a position of the own vehicle M based on signals received from GNSS satellites. The position of the own vehicle M may be specified by or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M specified by the GNSS receiver 51 (or any input position) to a destination input by an occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include a curvature of a road and point of interest (POI)

information. The route on the map is output to the MPU 60. The navigation device 50 may perform route guidance using the navigation HMI 52 based on the route on the map. The navigation device 50 may be realized by, for example, a function of a terminal device such as a smartphone or a tablet terminal possessed by an occupant. The navigation device 50 may transmit a present position and a destination to a navigation server via the communication device 20 to acquire the same route as the route on the map from the navigation server.

The MPU 60 includes, for example, a recommended lane determiner 61 and retains second map information 62 in a storage device such as an HDD or a flash memory. The recommended lane determiner 61 divides the route on the map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the own vehicle M can travel in a reasonable route to move to a branching destination.

The second map information 62 is map information that has higher precision than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by communicating with another device using the communication device 20.

The driving operator 80 includes, for example, an accelerator pedal, a brake pedal, a shift lever, a steering wheel, a heteromorphic steering wheel, a joystick, and other operators. A sensor that detects whether there is an operation or an operation amount is mounted in the driving operator 80 and a detection result is output to the automated driving control device 100 or some or all of the travel driving power output device 200, the brake device 210, and the steering device 220.

The automated driving control device 100 includes, for example, a first controller 120, a second controller 160, and a score table 180. Each of the first controller 120 and the second controller 160 is realized, for example, by causing a hardware processor such as a central processing unit (CPU) to execute a program (software). Some or all of the constituent elements may be realized by hardware (a circuit unit including circuitry) such as a large-scale integration (LSI), an application-specific integrated circuit (ASIC), a field-programmable gate array (FPGA), or a graphics-processing unit (GPU) or may be realized by software and hardware in cooperation. The program may be stored in advance in a storage device (a storage device including a non-transitory storage medium) such as an HDD or a flash memory of the automated driving control device 100 or may be stored in a detachably mounted storage medium (a non-transitory storage medium) such as a DVD, a CD-ROM, or the like so that the storage medium (a non-transitory storage medium) is mounted on a drive device to be installed on the HDD or the flash memory of the automated driving control device 100. The score table 180 is recorded on, for example, a storage device (see FIG. 5 for the details).

Figure 2:
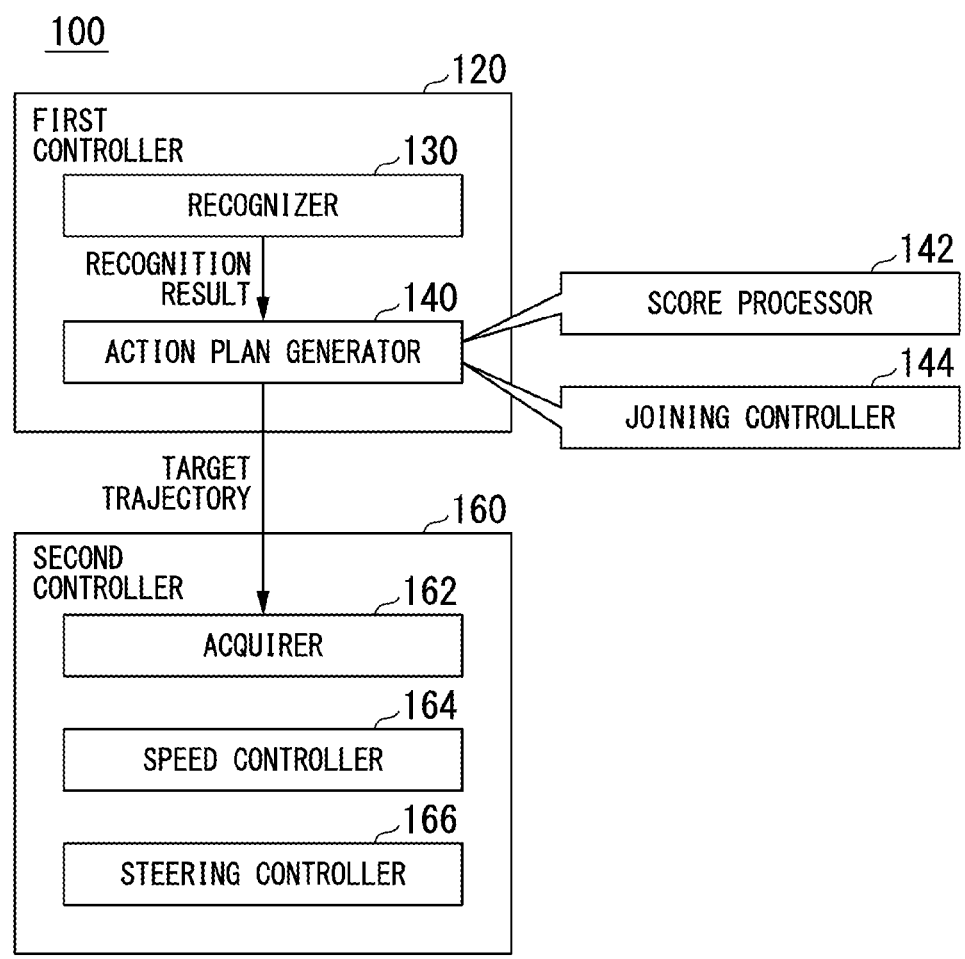
FIG. 2 is a diagram showing a functional configuration of a first controller and a second controller.

FIG. 2 is a diagram showing a functional configuration of the first controller 120 and the second controller 160. The first controller 120 includes, for example, a recognizer 130 and an action plan generator 140 (an example of an "action controller"). The first controller 120 realizes, for example, a function by artificial intelligence (AI) and a function by a model given in advance in parallel. For example, a function of "recognizing an intersection" may be realized by performing recognition of an intersection by deep learning or the like and recognition based on a condition given in advance (a signal, a road sign, or the like which can be subjected to pattern matching) in parallel, scoring both the recognitions, and performing evaluation comprehensively. Thus, reliability of automated driving is guaranteed.

The recognizer 130 recognizes states such as a position, a speed, acceleration, or the like of an object near the own vehicle M based on information input from the camera 10, the radar device 12, and the finder 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include acceleration or jerk of the object or an "action state" (for example, whether a vehicle is changing a lane or is attempting to change the lane).

The recognizer 130 recognizes, for example, a lane in which the vehicle M is traveling (a travel lane). For example, the recognizer 130 recognizes the travel lane by comparing patterns of road mark lines (for example, arrangement of continuous lines and broken lines) obtained from the second map information 62 with patterns of road mark lines around the vehicle M recognized from images captured by the camera 10. The recognizer 130 may recognize a travel lane by recognizing runway boundaries (road boundaries) including road mark lines or shoulders, curbstones, median strips, and guardrails without being limited to road mark lines. In this recognition, the position of the vehicle M acquired from the navigation device 50 or a process result by INS may be added. The recognizer 130 recognizes temporary stop lines, obstacles, red signals, toll gates, and other road events.

The recognizer 130 recognizes a position or a posture of the own vehicle M in the travel lane when the recognizer 130 recognizes the travel lane. For example, the recognizer 130 may recognize a deviation from the middle of a lane of a standard point of the own vehicle M and an angle formed with a line extending along the middle of a lane in the travel direction of the own vehicle M as a relative position and posture of the own vehicle M to the travel lane. Instead of this, the recognizer 130 may recognize a position or the like of the standard point of the own vehicle M with respect to any side end portion (a road mark line or a road boundary) of a travel lane as the relative position of the own vehicle M to the travel lane.

The action plan generator 140 generates a target trajectory along which the own vehicle M travels in future automatedly (irrespective of an operation or the like by a driver) so that the own vehicle M is traveling along a recommended lane determined by the recommended lane determiner 61 and can handle a surrounding situation of the own vehicle M in principle. The target trajectory includes, for example, a speed component. For example, the target trajectory is expressed by arranging spots (trajectory points) at which the own vehicle M will arrive in sequence. The trajectory point is a spot at which the own vehicle M will arrive for each predetermined travel distance (for example, about several [m]) in a distance along a road. Apart from the trajectory points, target acceleration and a target speed are generated as parts of the target trajectory for each of predetermined sampling times (for example, about a decimal point of a second). The trajectory point may be a position at which the own vehicle M will arrive at the sampling time for each predetermined sampling time. In this case, information regarding the target acceleration or the target speed is expressed according to an interval between the trajectory points.

The action plan generator 140 may set an automated driving event when the target trajectory is generated. As the automated driving event, there are a constant speed traveling event, a low-speed following traveling event, a lane changing event, a branching event, a joining event, a takeover event, and the like. The action plan generator 140 generates the target trajectory in accordance with an activated event.

The action plan generator 140 includes, for example, a score processor 142 and a joining controller 144. The details thereof will be described later.

The second controller 160 controls the travel driving power output device 200, the brake device 210, and the steering device 220 so that the own vehicle M passes along the target trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding a target trajectory (trajectory points) generated by the action plan generator 140 and stores the information in a memory (not shown). The speed controller 164 controls the travel driving power output device 200 or the brake device 210 based on a speed element incidental to the target trajectory stored in the memory. The steering controller 166 controls the steering device 220 in accordance with a curve state of the target trajectory stored in the memory. Processes of the speed controller 164 and the steering controller 166 are realized, for example, by combining feed-forward control and feedback control. For example, the steering controller 166 performs the feed-forward control in accordance with a curvature of a road in front of the own vehicle M and the feedback control based on separation from the target trajectory in combination.

The travel driving power output device 200 outputs a travel driving power (torque) for traveling the vehicle to a driving wheel. The travel driving power output device 200 includes, for example, a combination of an internal combustion engine, an electric motor, and a transmission and an electronic control unit (ECU) controlling them. The ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake operation is output to each wheel. The brake device 210 may include a mechanism that transmits a hydraulic pressure generated in response to an operation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

When a course of the vehicle M is changed to the lateral side, the automated driving control device 100 according to the embodiment determines a range in which the vehicle M is located relative to first and second vehicles in the longitudinal direction of a road based on a distance between a vehicle (the first vehicle) located on the lateral side of the vehicle M recognized by the recognizer 130 and a vehicle (the second vehicle) located on the side behind the first vehicle. The range in which the vehicle M is located relatively is, for example, a first or second range to be described below. Hereinafter, this process will be described.

Figure 3:
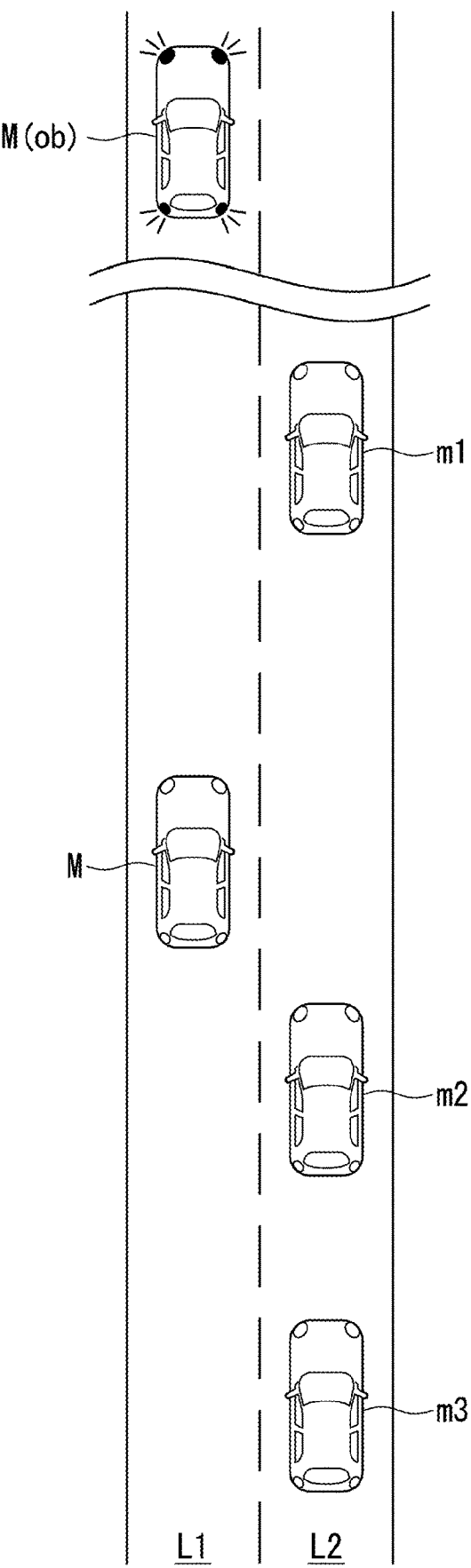
FIG. 3 is a diagram showing an example of a scenario in which a vehicle joins to an adjacent lane.

FIG. 3 is a diagram showing an example of a scenario in which the vehicle M joins an adjacent lane. In the example of the drawing, the vehicle M is traveling in a lane L1. In a lane L2 which is an adjacent lane of the lane L1, another vehicle m1 is at a position in front in a longitudinal direction of a road, still another vehicle m2 is on the side behind the vehicle M, and further still another vehicle m3 is traveling on the side behind the other vehicle m2. The position in the longitudinal direction of the road is a position of a traveling direction (front and rear directions) of the vehicle M in FIG. 3. The vehicle M is assumed to necessarily change its lane to the lane L2 before the vehicle M reaches a predetermined distance ahead. More specifically, when there is a stopped vehicle M (ob), as shown, construction is underway, or a lane disappears, the vehicle M determines that it is necessary to change its lane. As described above, when the automated driving control device 100 of the vehicle M determines to change its lane, a process to be described below is performed.

Figure 4:
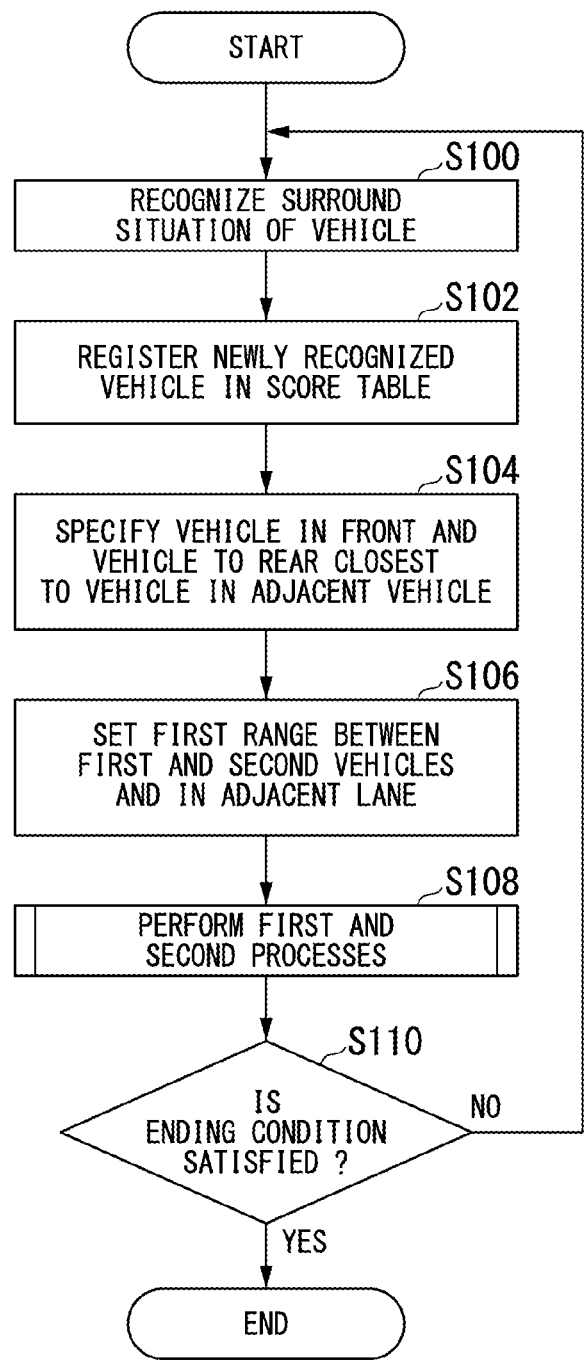
FIG. 4 is a flowchart showing an example of a flow of a process performed by an automated driving control device.

FIG. 4 is a flowchart showing an example of a flow of a process performed by the automated driving control device 100. First, the recognizer 130 recognizes a surrounding situation of the vehicle M (step S100). Subsequently, the score processor 142 registers other newly recognized vehicles in the score table 180 based on a recognition result of the recognizer 130 (step S102). Subsequently, based on the recognition result of the recognizer 130, the joining controller 144 specifies a vehicle in front closest to the vehicle M in the adjacent lane and a vehicle to the rear closest to the vehicle M in the adjacent lane (step S104).

Figure 5:
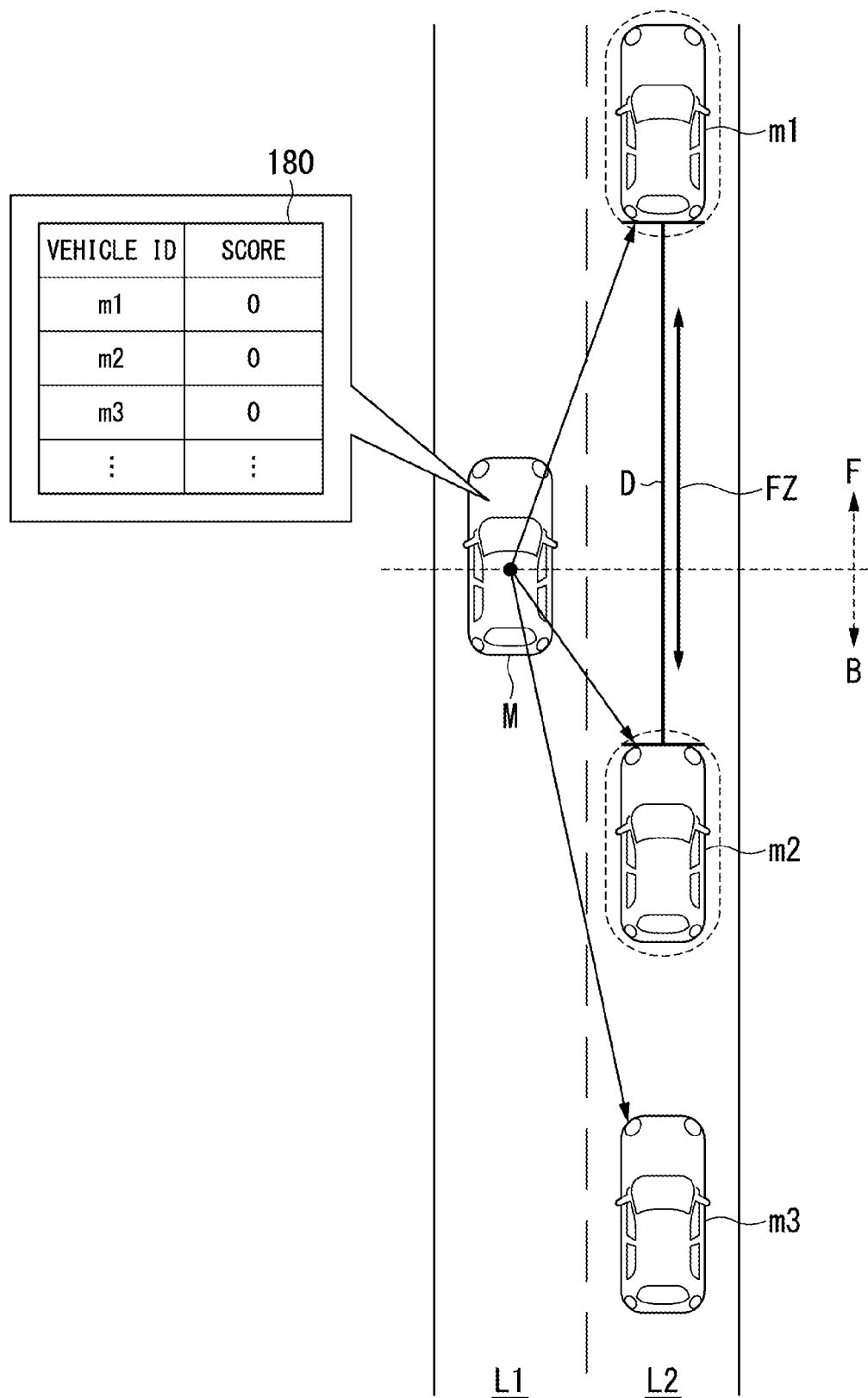
FIG. 5 is a diagram showing each process of the flowchart of FIG. 4.

Subsequently, the joining controller 144 sets a first range between the other vehicle m1 (a first vehicle) and the other vehicle m2 (a second vehicle) and in the lane L2 adjacent to the lane L1 in which the vehicle M is traveling (step S106). The first range is set between the vehicles in front and to the rear, as shown in FIG. 5 to be described below. Subsequently, the joining controller 144 performs a first process (see FIG. 6) and a second process (see FIG. 9) (step S108). Subsequently, the joining controller 144 determines whether an ending condition of the process is satisfied (step S110). The ending condition of the process is that the vehicle M satisfies a predetermined condition, for example, the vehicle M changes its lane to a lane of a lane change destination, the vehicle M pauses (or stops) the lane change, or the vehicle M makes a stop. When the ending condition of the process is not satisfied, the process returns to step S100. When the ending condition of the process is satisfied, the process of the flowchart ends.

FIG. 5 is a diagram showing each process of the flowchart of FIG. 4. When the joining controller 144 recognizes another vehicle, which has not been registered in the score table 180 based on the recognition result of the recognizer 130, the joining controller 144 associates identification information (ID) with the other newly recognized vehicle and registers the identification information in the score table 180. The score table 180 is an information table in which a score indicating the degree that another vehicle is predicted to have an intention to yield a course to the vehicle M (indicating friendliness) is associated with a vehicle ID.

Further, the joining controller 144 specifies other vehicles m1 and m2 closest to the vehicle M among the other vehicles m1 to m3 recognized by the recognizer 130. The other vehicle m1 is a vehicle that is traveling in the lane L2 and is in front (in the drawing, on the F side) of a standard position of the vehicle M at a position in the longitudinal direction of the road. The other vehicle m2 is a vehicle that is traveling in the lane L2 and is on the side behind (in the drawing, on the B side of) the standard position of the vehicle M at a position in the longitudinal direction of the road. The other vehicle m3 is a vehicle located on the side behind the other vehicle m2.

Further, the joining controller 144 sets a first range FZ between the other vehicles m1 and m2. For example, when a distance D between the other vehicles m1 and m2 is equal to or greater than a lower limit, the joining controller 144 sets the first range FZ. For example, when a distance D between the other vehicles m1 and m2 is less than the lower limit (a lower limit distance), the joining controller 144 does not set the first range FZ. In this case, for example, the joining controller 144 waits for a predetermined time until the distance D becomes equal to or greater than the lower limit, or changes the other vehicle which is a target. For example, the joining controller 144 may change the other vehicle which is a target with regard to derivation of the distance D and sets the first range FZ between the other vehicles m2 and m3. Hereinafter, of the other vehicles which are targets, a vehicle located in front is referred to as a "first vehicle" and a vehicle located behind is referred to as a "second vehicle" in some cases. A scheme of setting the size of the first range FZ will be described with reference to FIG. 8 to be described below.

For example, when the distance D between the other vehicles m1 and m2 or a distance from the rear of the first vehicle m1 is equal to or greater than a standard value (a standard distance) (when the distance D is a sufficient distance necessary to change the lane) or the size of the first range FZ in the longitudinal direction is equal to or greater than a predetermined size (when the size of the first range FZ in the longitudinal direction of the road is a sufficient distance necessary to change the lane), the joining controller 144 may change the lane of the vehicle M between the first and second vehicles irrespective of the second process (whether the second vehicle has an intention to yield the course) to be described below. That is, the joining controller 144 may change the lane of the vehicle M between the first and second vehicles without predicting whether the second vehicle has an intention to yield the road. The "distance from the rear of the first vehicle m1" is a length of an area in which there is no object of interest such as a vehicle when the lane is changed to the side behind the first vehicle m1.

[First Process]

Figure 6:
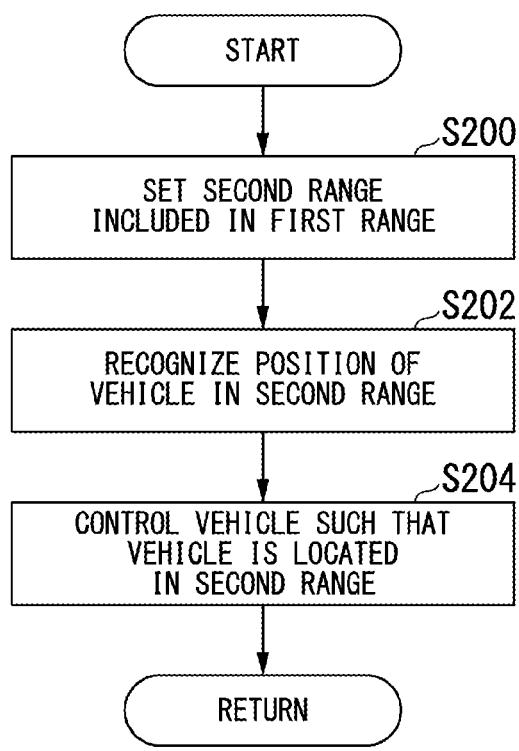
FIG. 6 is a flowchart showing an example of a flow of a first process performed by the automated driving control device.

FIG. 6 is a flowchart showing an example of a flow of a first process performed by the automated driving control device 100. First, the joining controller 144 sets a second range SZ included in the first range FZ (step S200). Subsequently, the joining controller 144 recognizes a position of the vehicle M in the second range SZ (step S202). Subsequently, the joining controller 144 controls the vehicle M such that the vehicle M is located within the second range SZ (or a center of the second range SZ with regard to a standard position of the second range SZ or a position in the longitudinal direction of the road, or the middle of the second range SZ) at the position in the longitudinal direction of the road (step S204). For example, the vehicle M is controlled such that a part of the vehicle M is included in the second range SZ. The part of the vehicle is substantially a middle of the vehicle M in the front to rear length of the vehicle M, the center of gravity of the vehicle M, or the like. For example, the term "located" means that control is performed such that the vehicle M is close to the position of a target. The length of the second range SZ in the longitudinal direction of the road may be shorter than the front to rear length of the vehicle M. Thus, the process of one route of the flowchart ends. In the process of FIG. 6, the control may be performed such that the vehicle M is included in the first range FZ (the center of the first range FZ) instead of the second range SZ.

Figure 7:
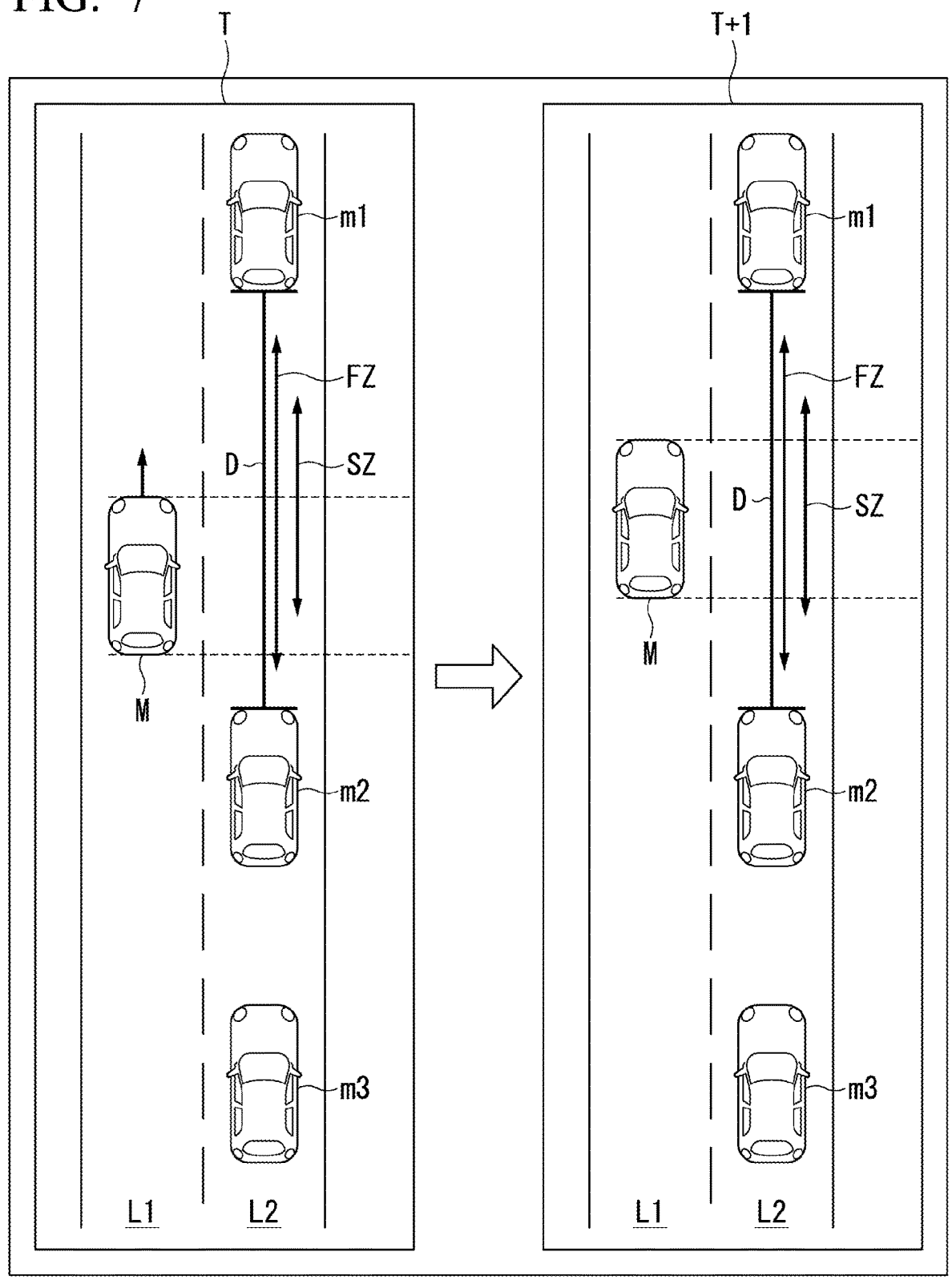
FIG. 7 is a diagram showing the first process.

FIG. 7 is a diagram showing the first process. At time T of FIG. 7, the joining controller 144 sets the second range SZ in the first range EZ. At this time, the joining controller 144 determines whether the vehicle M is within the second range SZ at a position in the longitudinal direction of the road. At time T of FIG. 7, when the vehicle M deviates from the second range SZ on the rear side, the joining controller 144 controls the vehicle M such that the vehicle M is included in the second range SZ at a position in the longitudinal direction of the road. Thus, at time T+1 of FIG. 7, the vehicle M is located so that the vehicle M is included in the second range SZ at the position in the longitudinal direction of the road.

The term "included" means that a part (for example, a representative point such as the center of gravity, a center of a front end, or a center between rear wheels) or all of the vehicle M are included in the second range SZ. The phrase "the vehicle M is included in the second range SZ at the position in the longitudinal direction of the road" means that when the second range SZ shown in FIG. 7 is slid to the lane L1 side, the vehicle M is included in the slid second range SZ.

When the vehicle M deviates from the second range SZ on the side in front, the joining controller 144 controls the vehicle M such that the vehicle M is included in the second range SZ at the position in the longitudinal direction of the road. When the vehicle M is included in the second range SZ at the position in the longitudinal direction of the road, the joining controller 144 controls the vehicle M such that a positional relation between the second range SZ and the vehicle M is maintained.

[Sizes of First and Second Ranges]

Figure 8:
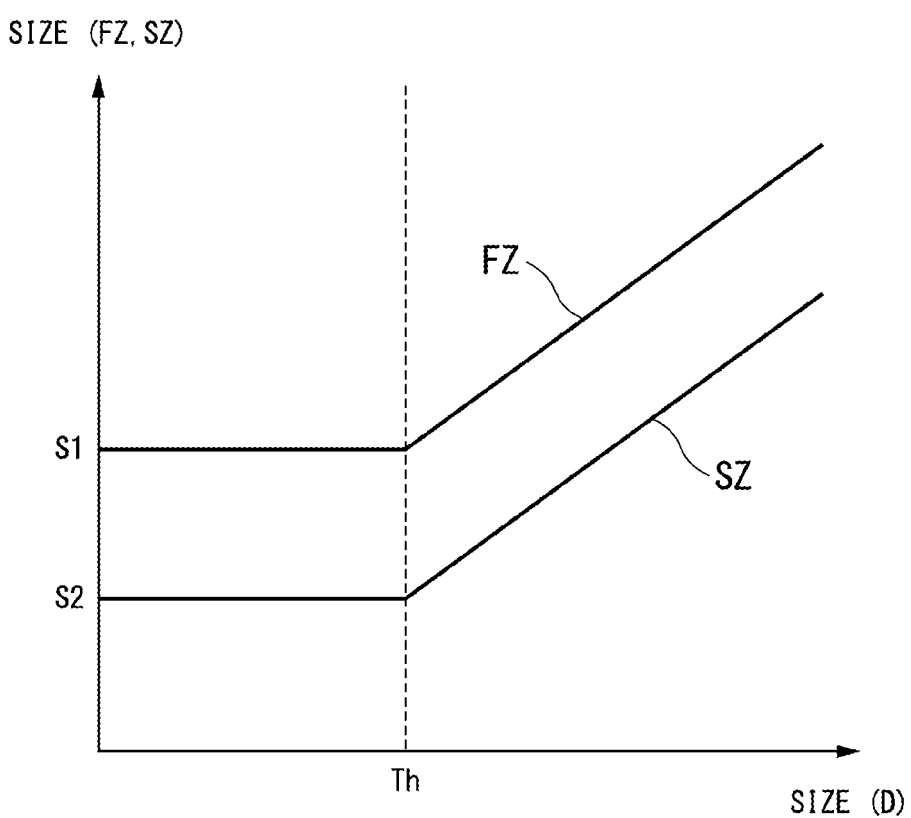
FIG. 8 is a diagram showing sizes of first and second ranges.

FIG. 8 is a diagram showing sizes of a first range FZ and a second range SZ. The vertical axis of FIG. 8 represents a size of the first range FZ or the second range SZ and the horizontal axis of FIG. 8 represents a size of the distance D between the first and second vehicles. As shown in FIG. 8, when the size of the distance D is equal to or less than a threshold Th, the size of the first range FZ in the longitudinal direction of the road is constant as a size S1 and the size of the second range SZ in the longitudinal direction of the road is constant as a size S2. When the size of the distance D is greater than the threshold Th, the size of the first range FZ in the longitudinal direction of the road and the size of the second range SZ in the longitudinal direction of the road are changed based on the distance D. For example, as the distance D increases, the size of the first range FZ in the longitudinal direction of the road and the size of the second range SZ in the longitudinal direction of the road increase. For example, the degree that the size of the first range FZ increases and the degree that the size of the second range increases are substantially the same. The threshold Th is an example of a "first distance" or a "second distance." The threshold Th (the second distance) of the first range FZ and the threshold Th (the first distance) of the second range SZ may be different values.

The processes of FIGS. 7 and 8 are summarized as follows.

(1) When the vehicle M is within the second range SZ, the vehicle M maintains a positional relation between the vehicle M and the second range SZ.

(2) When the vehicle M is on the side behind the second range SZ and the vehicle M and the other vehicles (the first and second vehicles) are traveling at the same speed (or the speeds of the other vehicles are greater than the speed of the vehicle M), the vehicle M accelerates to travel so that the vehicle M is located within the second range SZ. When the vehicle M is on the side behind the second range SZ and the speeds of the other vehicles are less than the speed of the vehicle M, the vehicle M maintains the current speed (or accelerates) to travel so that the vehicle M is located within the second range SZ.

(3) When the vehicle M is on the side in front of the second range SZ and the vehicle M and the other vehicles are traveling at substantially the same speed (or the speeds of the other vehicles are less than the speed of the vehicle M), the vehicle M decelerates to travel so that the vehicle M is located within the second range SZ. When the vehicle M is on the side in front of the second range SZ and the speeds of the other vehicles are greater than the speed of the vehicle M, the vehicle M maintains the current speed (or decelerates) to travel so that the vehicle M is located within the second range SZ.

As described above, the joining controller 144 changes the size of the first range FZ or the size of the second range SZ based on the distance D. Further, the joining controller 144 controls the vehicle M such that the vehicle M is located within the second range SZ. Thus, the vehicle is controlled such that the vehicle is at a position at which joining control is performed smoothly through the second process to be described below, and thus the joining control of the vehicle is performed smoothly.

[Second Process]

Figure 9:
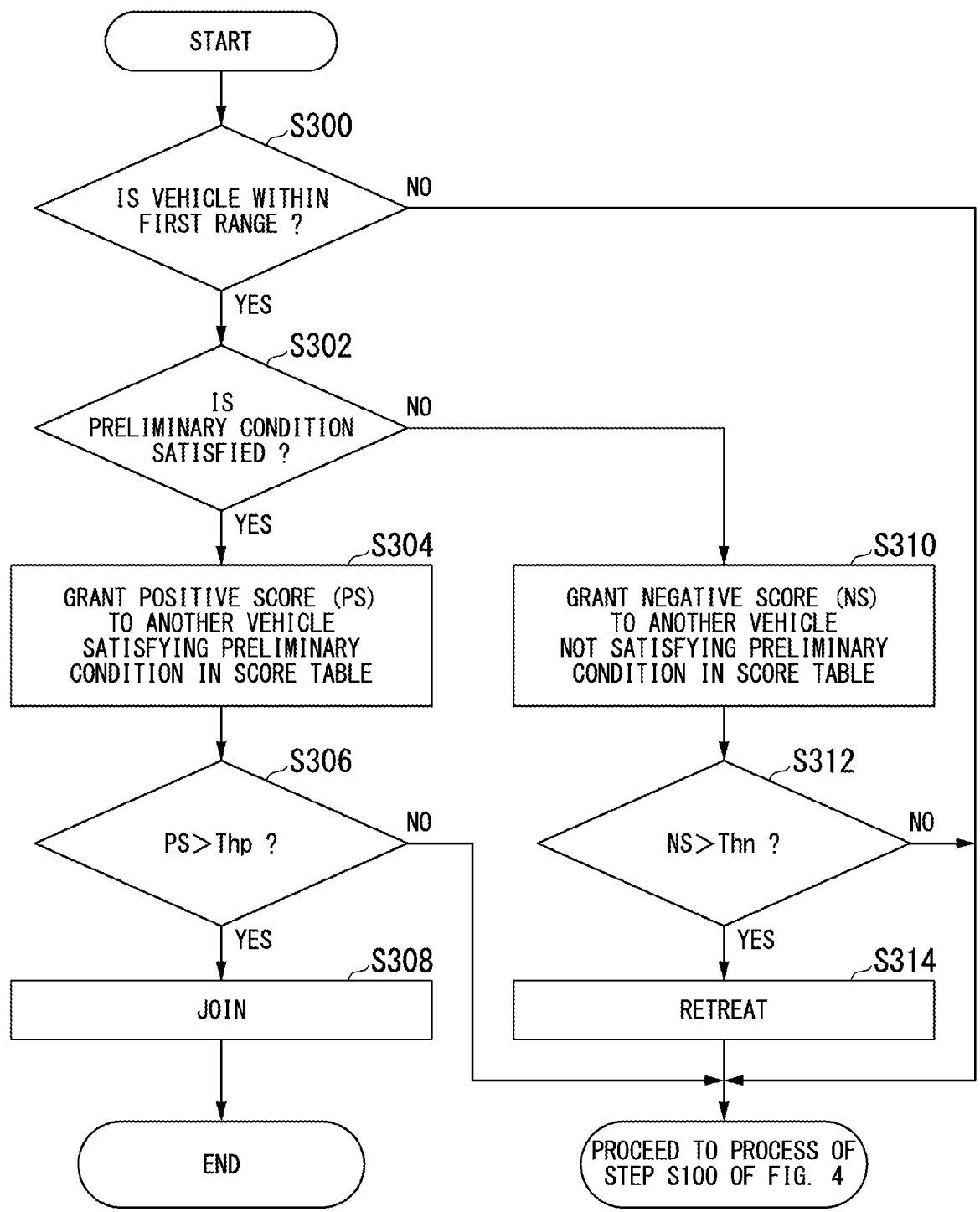
FIG. 9 is a flowchart showing an example of a flow of a second process performed by the automated driving control device.

FIG. 9 is a flowchart showing an example of a flow of the second process performed by the automated driving control device 100. First, the joining controller 144 determines whether the vehicle M is within the first range FZ at the position in the longitudinal direction of the road (step S300). When the vehicle M is not within the first range FZ, the process proceeds to a process of step S100 of the flowchart of FIG. 4. When the vehicle M is within the first range FZ, the joining controller 144 determines whether the second vehicle satisfies a preliminary condition (step S302).

When the preliminary condition is satisfied, the joining controller 144 grants a positive score (PS) to the second vehicle satisfying the preliminary condition in the score table 180 (step S304). The joining controller 144 determines whether the positive score (PS) of the second vehicle is greater than a threshold Thp with reference to the score table 180 (step S306). When the positive score (PS) of the second vehicle is not greater than a threshold Thp, the process proceeds to step S100 of the flowchart of FIG. 4. When the positive score (PS) of the second vehicle is greater than the threshold Thp, the joining controller 144 performs control to join in an area between the first and second vehicles (step S308). In this way, the process of the flowchart ends.

When the preliminary condition is not satisfied, the joining controller 144 grants a negative score (NS) to the second vehicle not satisfying the preliminary condition in the score table 180 (step S310). The joining controller 144 determines whether the negative score (NS) of the second vehicle is greater than a threshold Thn with reference to the score table 180 (step S312).

When the negative score (NS) of the second vehicle is not greater than the threshold Thn, the process proceeds to step S100 of the flowchart of FIG. 4. When the negative score (NS) of the second vehicle is greater than the threshold Thn, for example, the joining controller 144 retreats the vehicle M to the side behind the second vehicle, sets the other vehicle which is the second vehicle to the first vehicle, and sets the other vehicle on the side behind the newly set first vehicle to the second vehicle (step S314). Then, the process returns to step S100 of the flowchart of FIG. 4 and each of the above-described processes is performed again. In this way, the process of the flowchart ends.

In the process of comparing the score of step S306 or step S312 with the threshold, as a score target compared with the threshold, a score accumulated by repeatedly performing the process of the flowchart of FIG. 9 may be considered as a target or a score derived in the process of one routine may be considered as a target.

The processes of steps S304, S306, S310, and S312 may be omitted. In this case, for example, when the preliminary condition is satisfied (or the preliminary condition is satisfied a predetermined number of times), the vehicle M performs the joining control. When the preliminary condition is not satisfied (or the preliminary condition is not satisfied a predetermined number of times), the vehicle M retreats to the side behind the second vehicle.

[Preliminary Conditions]

Hereinafter, preliminary conditions will be described. The second vehicle satisfying a preliminary condition is, for example, the second vehicle predicted to have an intention to yield a course to the vehicle M. A preliminary condition is, for example, a condition which is based on one or both of the first range FZ (the second range SZ or a distance between the first and second vehicles) and a state of the second vehicle (or states of the first and second vehicles).

(Preliminary Condition 1)

Figure 10:
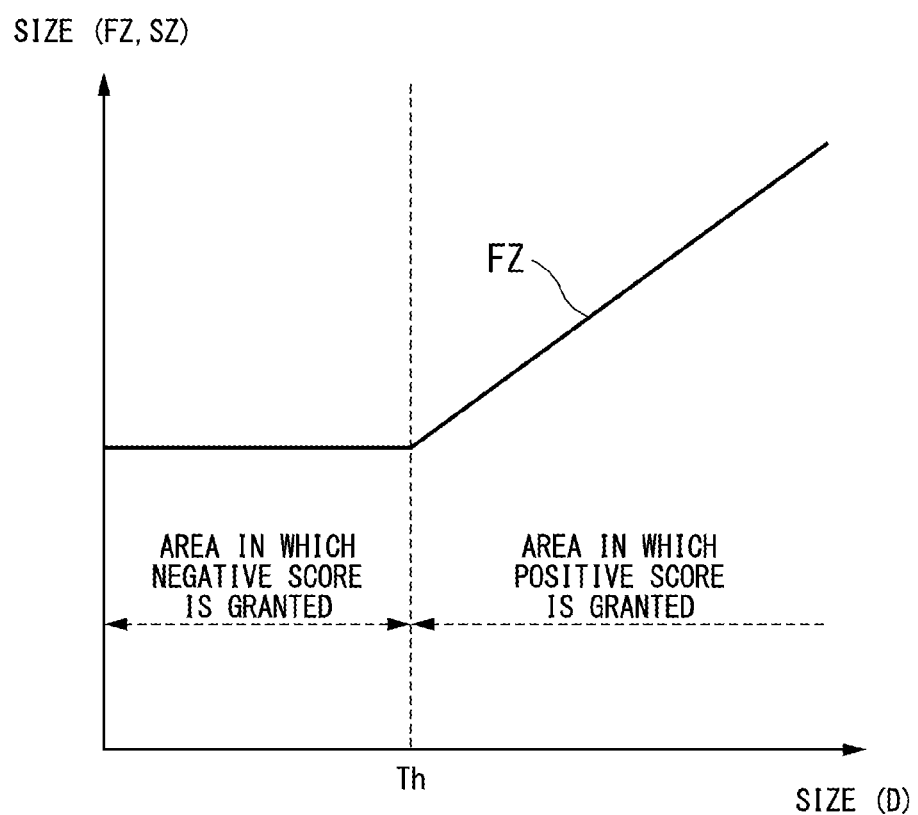
FIG. 10 is a diagram showing an example of a preliminary condition.

FIG. 10 is a diagram showing an example of a preliminary condition. The repeated description in FIG. 8 will be omitted. For example, an area in which the size of the distance D is greater than the threshold Th is an area in which a positive score is granted, and an area in which the size of the distance D is less than the threshold Th is an area in which a negative score is granted. When the size of the distance D is greater than the threshold, preliminary condition 1 is satisfied. When the size of the distance D is equal to or less than the threshold, preliminary condition 1 is not satisfied. The positive score and the negative score are scores indicating the degree that the second vehicle is predicted to have an intention to yield a course to the vehicle M. The positive score is a score indicating that the intention of the second vehicle to yield the course to the vehicle M is predicted to be positive. The negative score is a score indicating that the intention of the second vehicle to yield the course to the vehicle M is predicted to be negative.

The value of the positive score or the value of the negative score may be changed in accordance with the distance D. In this case, the value of the positive score is set to be larger as the distance D is larger. The value of the negative score is set to be larger as the distance D is smaller. When the distance D becomes greater than the distance D in a previous process, it may be determined that preliminary condition 1 is satisfied.

(Preliminary Condition 2)

Preliminary condition 2 is, for example, a condition which is based on a state of the second vehicle (or states of the first and second vehicles). For example, preliminary condition 2 is that a speed of the second vehicle is less than a speed measured a predetermined time before, a speed difference between a speed (speed A) of the second vehicle and a speed (speed B>speed A) of the vehicle M is greater than a speed difference measured a predetermined time before, a speed of the second vehicle is less than a speed of the vehicle M by a predetermined speed, a speed of the second vehicle decreases in a state in which a speed of the first vehicle does not change, or a speed of the second vehicle is less than a speed of the vehicle M in a state in which a speed of the first vehicle does not change.

(Preliminary Condition 3)

Preliminary condition 3 may be a combination of preliminary condition 1 and preliminary condition 2.

In step S302 of FIG. 9, instead of the determination of whether a preliminary condition is not satisfied, the joining controller 144 may predict an intention of the second vehicle to yield a course to the vehicle M, may evaluate a prediction result, and may derive a positive score or a negative score based on an evaluation result. For example, the joining controller 144 may process a score which is based on the size of the first range FZ in the longitudinal direction of the road and a score which is based on an index related to a state of the second vehicle (for example, variability of a speed of the second vehicle, a relative speed of the first vehicle to the vehicle M, variability of the relative speed, or the like) statistically, may derive an integral score, and may derive a positive score or a negative score based on the derived score. The joining controller 144 applies the size of the first range FZ in the longitudinal direction and an index (for example, variability of a speed) related to the state of the second vehicle to a predetermined function and may derive an integral score.

[Scenario (Part 1) in which Second Process is Performed]

Figure 11:
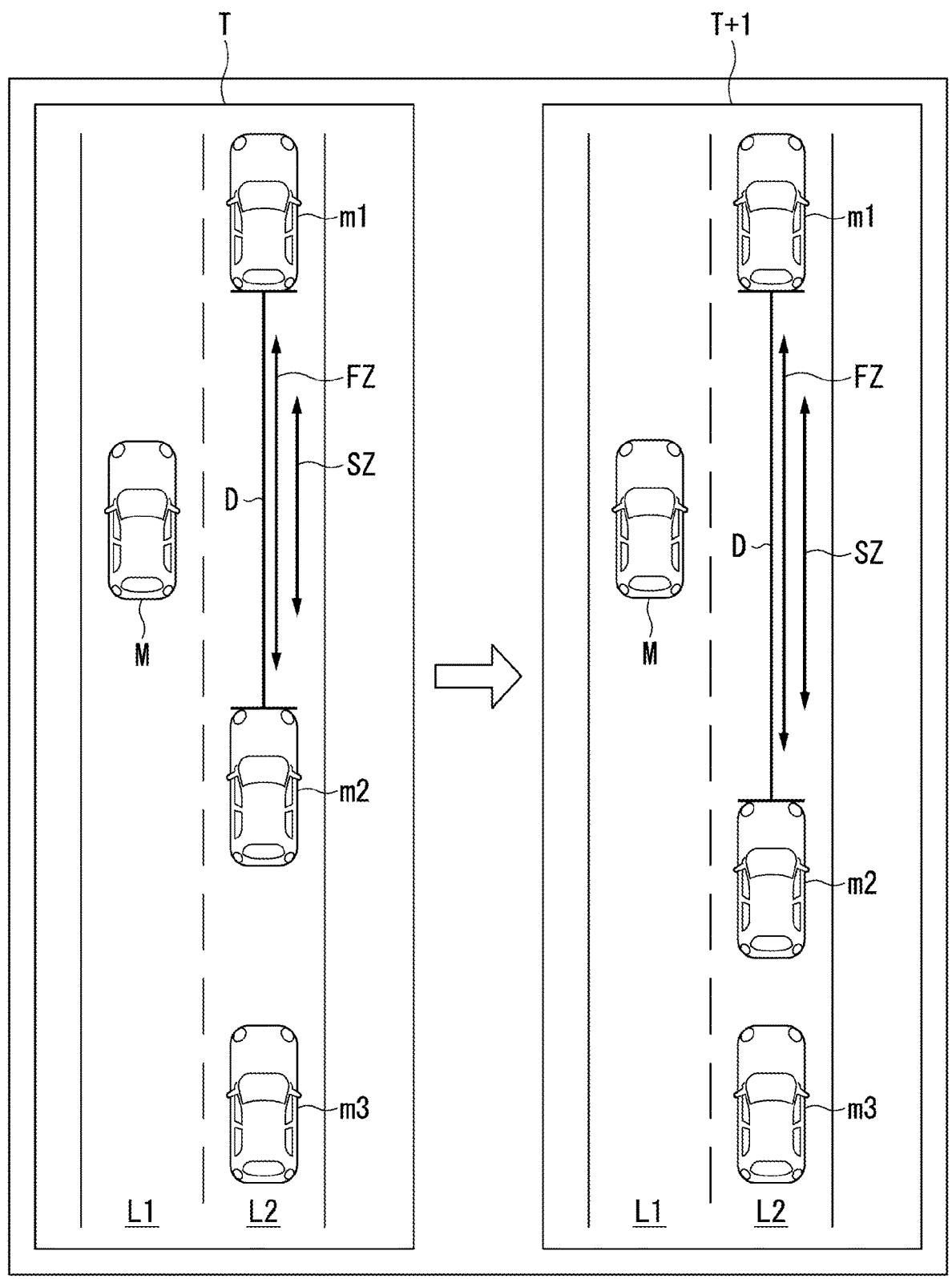
FIG. 11 is a diagram showing an example of a scenario in which a positive score is granted.
Figure 12:
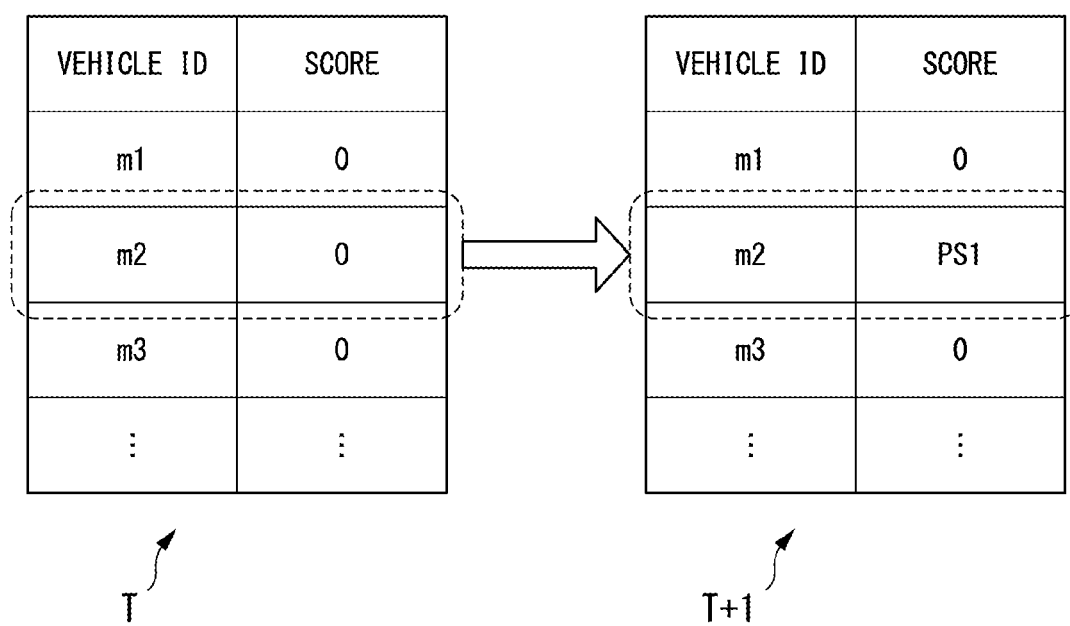
FIG. 12 is a conceptual diagram when a positive score is granted in a score table.

FIG. 11 is a diagram showing an example of a scenario in which a positive score is granted. At time T, the vehicle M is located within the second range SZ at a position in the longitudinal direction of a road. When a preliminary condition is satisfied at time T+1, a positive score is granted to the second vehicle (the other vehicle m2) in the score table 180. This is because when the preliminary condition is satisfied, the second vehicle maintains the distance D to the degree that the vehicle M can enter in front of the second vehicle, the second vehicle is decelerating, and the second vehicle is not accelerating even when the first vehicle is accelerating. FIG. 12 is a conceptual diagram when a positive score is granted in the score table 180.

[Scenario (Part 2) in which Second Process is Performed]

Figure 13:
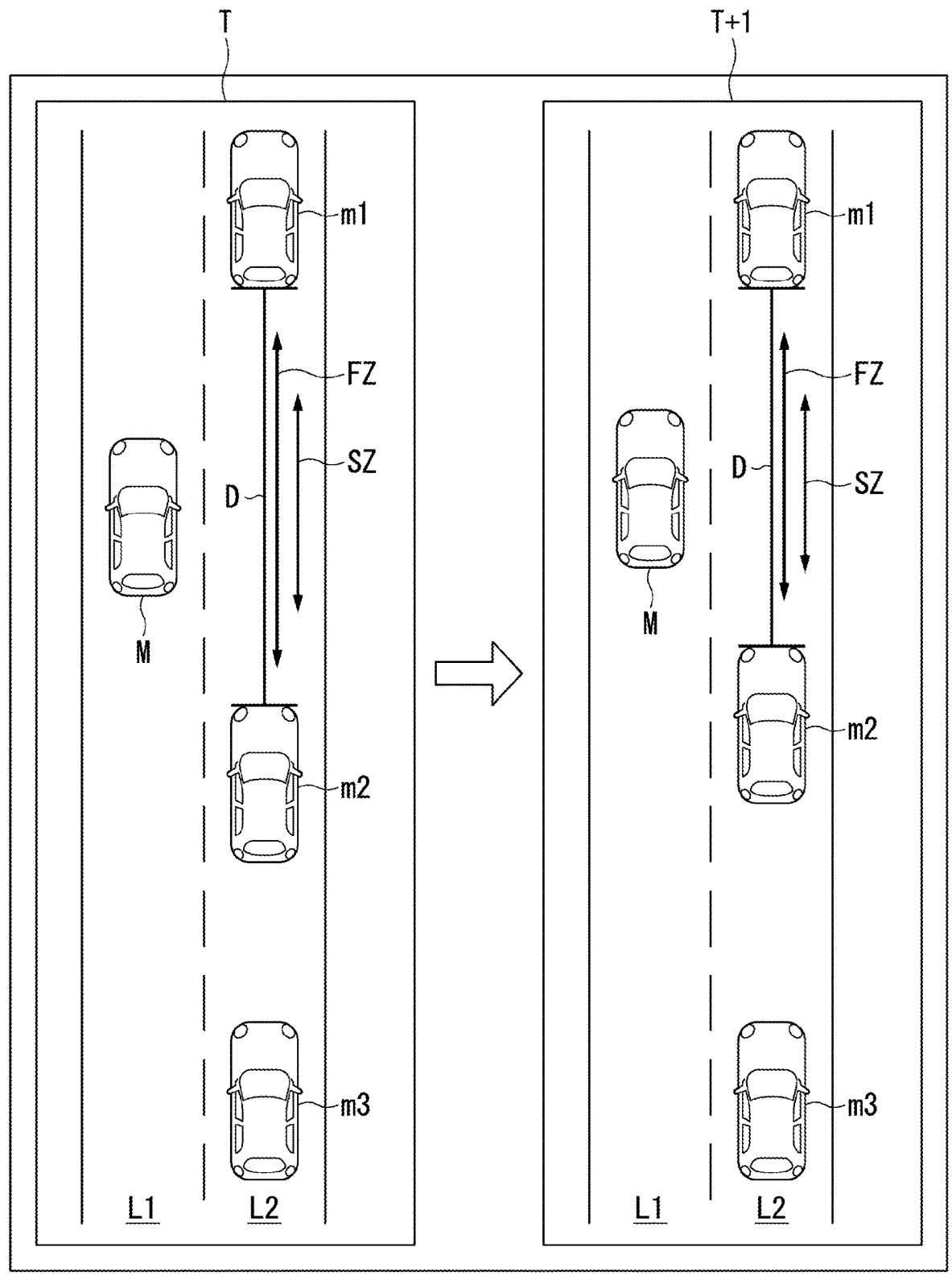
FIG. 13 is a diagram showing an example of a scenario in which a negative score is granted.
Figure 14:
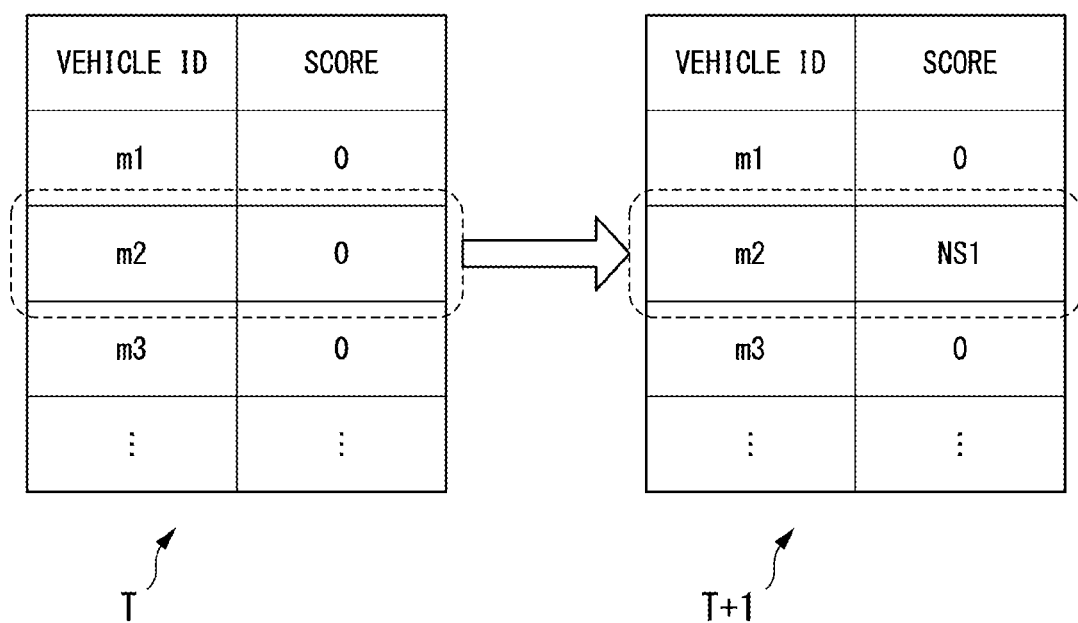
FIG. 14 is a conceptual diagram when a negative score is granted in a score table.

FIG. 13 is a diagram showing an example of a scenario in which a negative score is granted. At time T, the vehicle M is located within the second range SZ at a position in the longitudinal direction of a road. When a preliminary condition is not satisfied at time T+1, a negative score is granted to the second vehicle (the other vehicle m2) in the score table 180. This is because when the preliminary condition is not satisfied, the second vehicle is controlled such that there is not a distance D to the degree that the vehicle M can enter in front of the second vehicle, the second vehicle is accelerating, and the first vehicle is accelerating and the second vehicle is also accelerating. FIG. 14 is a conceptual diagram when a negative score is granted in the score table 180.

Figure 15:
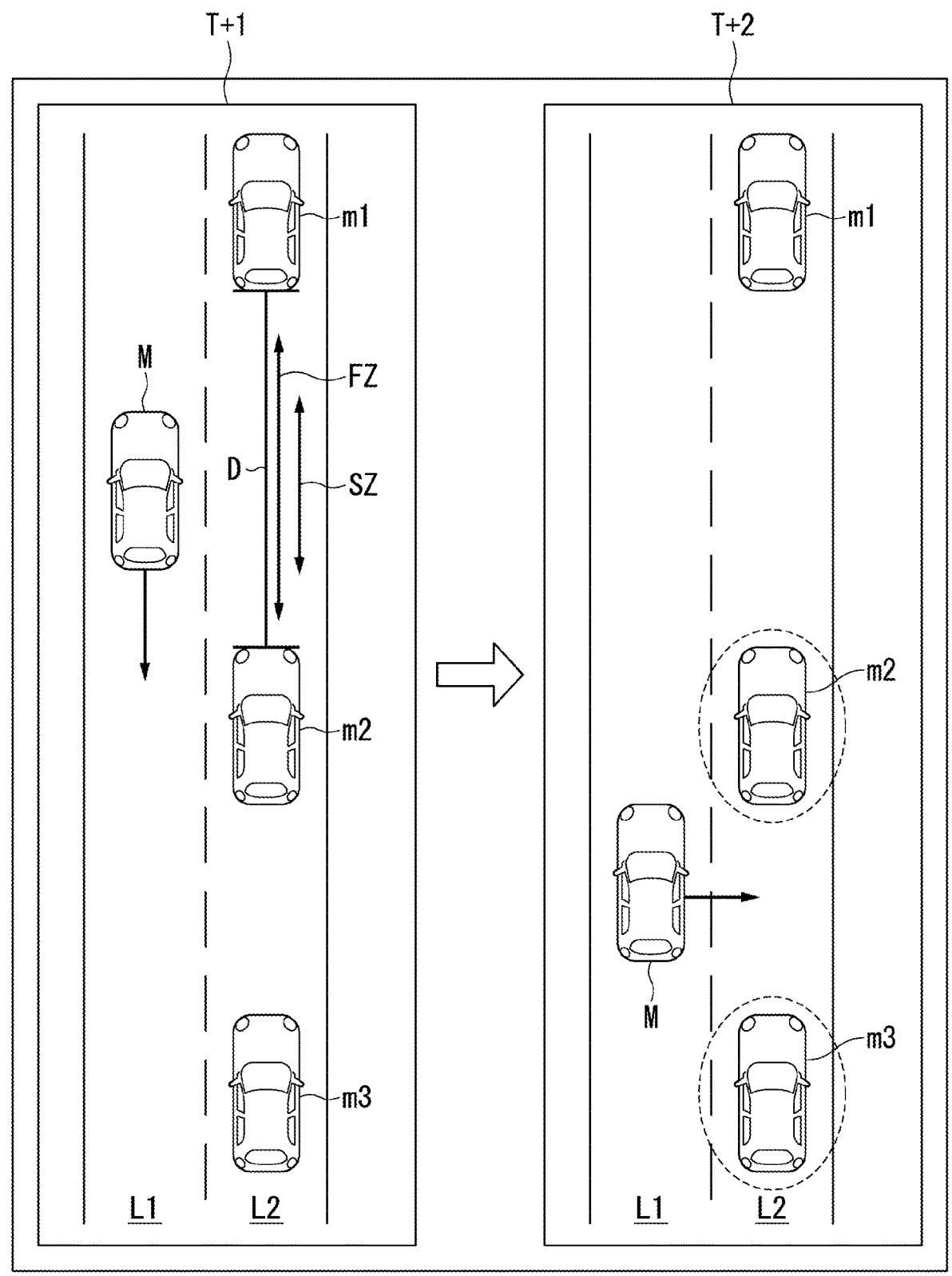
FIG. 15 is a diagram showing an example of a behavior of a vehicle when a preliminary condition is not satisfied.

As described above, when the preliminary condition is not satisfied and it is predicted that the second vehicle has no intention to yield the course to the vehicle M, the vehicle M changes vehicles which are targets of the first and second vehicles. FIG. 15 is a diagram showing an example of a behavior of the vehicle M when a preliminary condition is not satisfied. At time T, the vehicle M is located within the second range SZ at a position in the longitudinal direction of a road. At time T+1, for example, when a preliminary condition has not been satisfied consecutively a predetermined number of times (when a state in which a negative score is equal to or greater than a threshold continues for a predetermined time), the vehicle M retreats from the second vehicle. Then, the joining controller 144 sets the second vehicle (the other vehicle m2) as the first vehicle at time T, sets the other vehicle m3 as the second vehicle, and performs subsequent processes. When it is predicted that the other vehicle m3 which is the second vehicle has an intention to yield a course to the vehicle M, the vehicle M joins in front of the other vehicle m3.

According to the above-described first embodiment, when the course of the vehicle M is changed to a lateral side, the automated driving control device 100 determines a range in which the vehicle M is located relative to the first and second vehicles in the longitudinal direction of the road based on a distance between the first vehicle located on the lateral side of the vehicle M and the second vehicle located on the side behind the first vehicle, and thus it is possible to control the vehicle with higher precision in accordance with a surrounding situation.

Further, when it is predicted that the second vehicle has an intention to yield the course to the vehicle M, the automated driving control device 100 causes the vehicle M to move to front of the second vehicle. As a result, it is possible to inhibit the lane change which is not intended by the second vehicle.

When it is predicted that the second vehicle has no intention to yield the course to the vehicle M, the automated driving control device 100 sets the second vehicle as a new first vehicle and sets a vehicle located on the side behind the second vehicle as a new second vehicle. The automated driving control device 100 sets the first range FZ between the new first and second vehicles based on a distance between the new first and second vehicles and controls the vehicle M such that a part of the vehicle M (for example, substantially a middle or a center of gravity of the front to rear length of the vehicle M) at the position in the longitudinal direction of the road is included in the set first range FZ (or the second range SZ). As a result, it is possible to realize the lane change more reliably while inhibiting the lane change which is not intended by the second vehicle.

Second Embodiment

Hereinafter, a second embodiment will be described. In the second embodiment, driving support is performed instead of (or in addition to) the automated driving. In the driving support, the first and second processes described in the first embodiment are performed. Hereinafter, differences from the first embodiment will be described.

Figure 16:
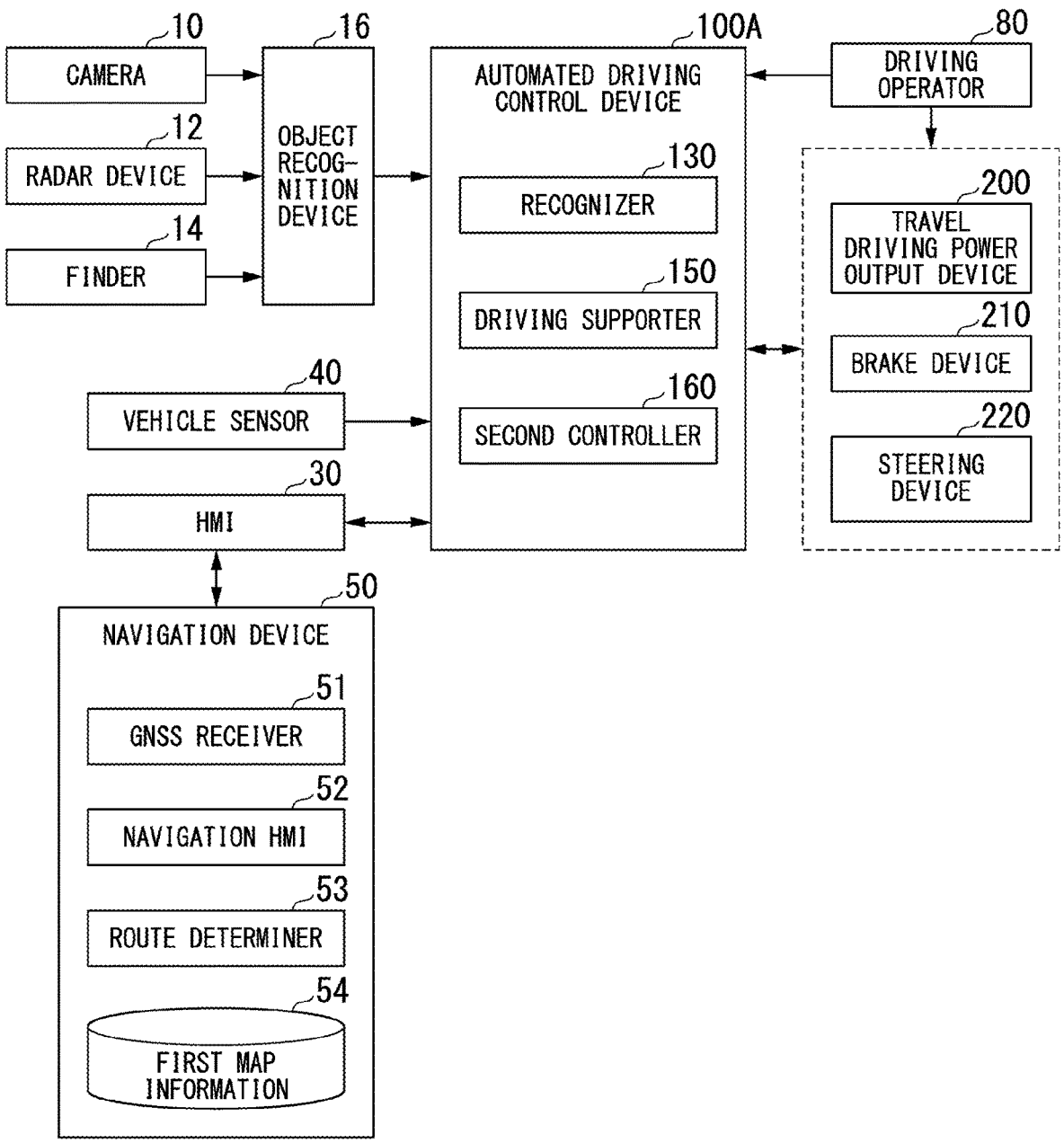
FIG. 16 is a diagram showing a configuration of a vehicle system according to a second embodiment in which a vehicle control device is used.

FIG. 16 is a diagram showing a configuration of a vehicle system 1A according to the second embodiment in which the vehicle control device is used. Differences from the vehicle system 1 will be described mainly. The vehicle system 1A includes, for example, a driving support device 100A instead of the automated driving control device 100. In the vehicle system 1A, the communication device 20 and the MPU 60 are omitted.

The driving support device 100A includes the recognizer 130, a driving supporter 150, and the second controller 160. For example, the driving supporter 150 controls the vehicle M such that the lane is automatically changed to the lane L2 adjacent to the lane L1 in which the vehicle M is traveling. That is, the driving supporter 150 performs auto lane change (ALC). A user operates the HMI 30 to cause the driving supporter 150 to perform the auto lane change.

The driving supporter 150 performs a process similar to the process performed when the first controller 120 according to the first embodiment changes a lane and automatically changes the lane L1 to the lane L2.

According to the above-described second embodiment, advantages similar to those of the first embodiment are obtained.

The driving supporter 150 may perform driving support control such as an adaptive cruise control system (ACC) or a lane-keeping assistance system (LKAS). In this case, the driving supporter 150 may also control the vehicle M such that the vehicle M is included in the first range FZ at a position in the longitudinal direction of the road even when there is no schedule for changing the lane as in the first embodiment. For example, through this control, the vehicle M is controlled such that the vehicle M is located away from the first and second vehicles. Thus, even when behaviors of these vehicles are changed, a more appropriate behavior can be performed and a comfort is improved for a user boarding the vehicle M. Further, when the vehicle M changes a lane, the lane can be changed quickly.

[Hardware Configuration]

Figure 17:
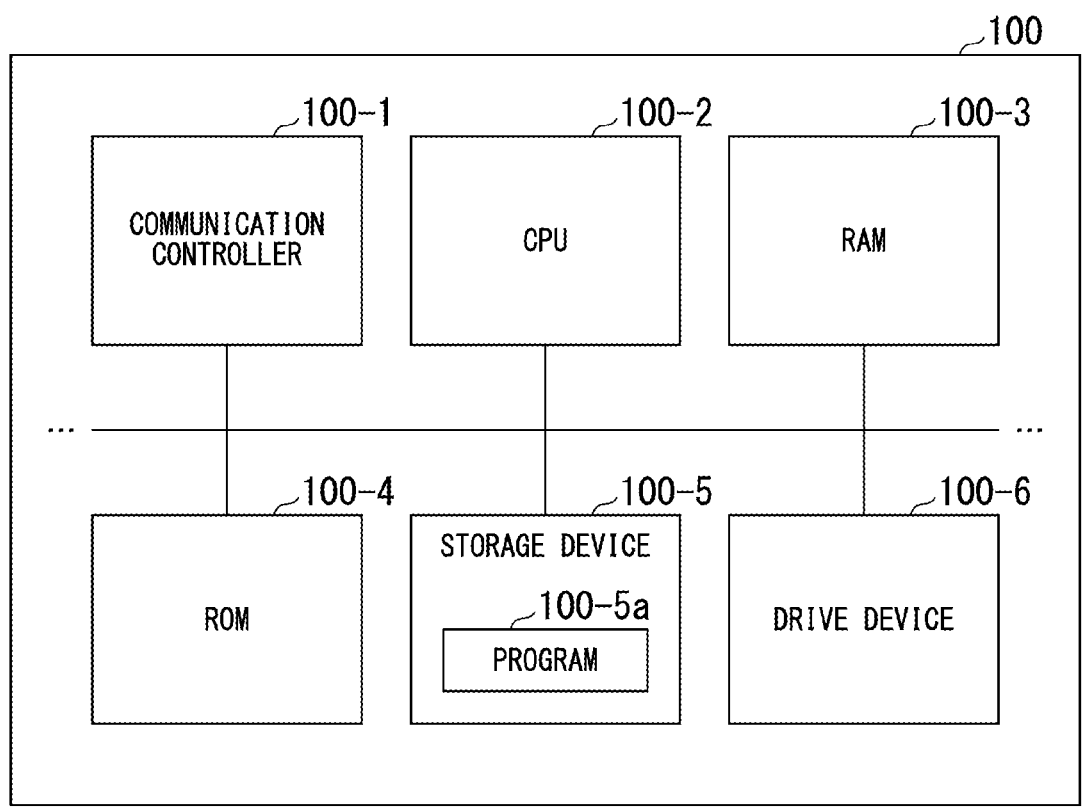
FIG. 17 is a diagram showing an example of a hardware configuration of the automated driving control device according to an embodiment.

FIG. 17 is a diagram showing an example of a hardware configuration of an automated driving control device 100 according to an embodiment. As shown, the automated driving control device 100 is configured such that a communication controller 100-1, a CPU 100-2, a random-access memory (RAM) 100-3 that is used as a working memory, a read-only memory (ROM) 100-4 that stores a boot program or the like, a storage device 100-5 such as a flash memory or a hard disk drive (HDD), a drive device 100-6, and the like are connected to each other via an internal bus or a dedicated communication line. The communication controller 100-1 performs communication with constituent element other than the automated driving control device 100. The storage device 100-5 stores a program 100-5a that is executed by the CPU 100-2. The program is loaded on the RAM 100-3 by a direct memory access (DMA) controller (not shown) to be executed by the CPU 100-2. Thus, some or all of the recognizer 130 and the action plan generator 140 are realized.

The above-described embodiment can be expressed as follows:

a vehicle control device including a storage device that stores a program and a hardware processor, the hardware processor executing the program stored in the storage device, to recognize a surrounding situation of a vehicle;
to control an action of the vehicle; and
to determine a range in which the vehicle is located relative to a first vehicle located on a lateral side of the recognized vehicle and a second vehicle located on a side behind the first vehicle in a longitudinal direction of a road based on a distance between the first and second vehicles when a course of the vehicle is changed to the lateral side.

The embodiments for carrying out the present invention have been described above, but the present invention is not limited to the embodiments. Various modifications and substitutions can be made within the scope of the present invention without departing from the gist of the present invention.

EXPLANATION OF REFERENCES

1 Vehicle system
100 Automated driving control device
120 First controller
140 Action plan generator
142 Score processor
144 Joining controller
160 Second controller

What is claimed is:

1. A vehicle control device, comprising:
a memory that stores instructions, and
one or more processors that execute the instructions to:
control a speed of a vehicle such that at least a part of the vehicle is included within a reference range set between a first vehicle and a second vehicle based on a distance between the first vehicle and the second vehicle when a course of the vehicle is to be changed to a lateral side of a current position of the vehicle, the first vehicle being located on the lateral side, the second vehicle being located on the lateral side behind the first vehicle in a longitudinal direction of a road,
performing a score granting processing,
in a first case in which a positive score is equal to or greater than a first threshold, cause the vehicle to move to a space between the first vehicle and the second vehicle,
in a second case in which a negative score is equal to or greater than a second threshold, move the vehicle to behind the second vehicle, and
the negative score and the positive score is associated with an identification information of the second vehicle in a score table recorded on a storage device,
the score granting processing comprising:
granting the positive score to the identification information of the second vehicle in the score table when at least the part of the vehicle is included within the reference range and the distance between the first vehicle and the second vehicle is equal to or greater than a threshold, and
granting the negative score to the identification information of the second vehicle in the score table when at least the part of the vehicle is included within the reference range and the distance between the first vehicle and the second vehicle is shorter than the threshold.

2. The vehicle control device according to claim 1, wherein the lateral side comprises an adjacent lane adjacent to a lane in which the vehicle is traveling, and wherein the first vehicle and the second vehicle are traveling in the same direction as a travel direction of the vehicle.

3. The vehicle control device according to claim 1, wherein the reference range is included as a portion of another range, wherein the reference range and the another range are in the longitudinal direction of the road, and the another range is a range set between the first vehicle and the second vehicle based on the distance between the first vehicle and the second vehicle.

4. The vehicle control device according to claim 3, wherein the part of the vehicle is substantially a middle of a front to rear length of the vehicle.

5. The vehicle control device according to claim 3, wherein the one or more processors execute the instructions to
increase the reference range in the longitudinal direction of an adjacent lane adjacent to a lane in which the vehicle is traveling as the distance between the first vehicle and the second vehicle becomes longer, and
decrease a size of the reference range in the longitudinal direction of the adjacent lane as the distance between the first vehicle and the second vehicle becomes shorter.

6. The vehicle control device according to claim 5, wherein the one or more processors execute the instructions to
cause the size of the reference range in the longitudinal direction of the adjacent lane to be constant when the distance between the first vehicle and the second vehicle becomes equal to or less than a first distance, and
increase the reference range in the longitudinal direction as the distance becomes longer when the distance between the first vehicle and the second vehicle becomes greater than the first distance.

7. The vehicle control device according to claim 3, wherein the one or more processors do not change the course of the vehicle to the lateral side when the distance between the first vehicle and the second vehicle becomes less than a lower limit distance for setting the another range.

8. The vehicle control device according to claim 7, wherein the one or more processors execute the instructions to change a size of the another range in the longitudinal direction based on the distance between the first vehicle and the second vehicle.

9. The vehicle control device according to claim 8, wherein the one or more processors execute the instructions to
cause the size of the another range in the longitudinal direction to be constant when the distance between the first vehicle and the second vehicle becomes equal to or less than a second distance, and
increase the another range in the longitudinal direction as the distance becomes longer when the distance between the first vehicle and the second vehicle becomes greater than the second distance.

10. The vehicle control device according to claim 3, wherein the one or more processors execute the instructions to cause ratio between sizes of the another range and the reference range in the longitudinal direction to be substantially constant.

11. The vehicle control device according to claim 3, wherein the one or more processors execute the instructions to control the vehicle such that the vehicle is close to a middle of the reference range.

12. The vehicle control device according to claim 1, wherein the one or more processors execute the instructions to determine whether the second vehicle located on the lateral side behind an area of a lane change destination has an intention to yield the course and changes a lane of the vehicle to the area when it is predicted that the second vehicle has the intention to yield the course.

13. The vehicle control device according to claim 1, wherein the distance is a first distance, and wherein the one or more processors execute the instructions to
predict whether the second vehicle located on the lateral side behind an area of a lane change destination has an intention to yield the course, and sets the second vehicle to a new first vehicle and sets another vehicle located on the lateral side behind the second vehicle as a new second vehicle when it is predicted that the second vehicle has no intention to yield the course, and
control the vehicle such that a portion of the vehicle is included in a first or second range set between the new first vehicle and the new second vehicle based on a second distance between the new first vehicle and the new second vehicle.

14. The vehicle control device according to claim 13, wherein the one or more processors execute the instructions to change a lane without performing the prediction when a third distance in the longitudinal direction from another area in which there is no vehicle on the lateral side behind the first vehicle is equal to or greater than a standard distance.

15. The vehicle control device according to claim 1, wherein a value of the positive score and a value of the negative score is changed in accordance with the distance between the first vehicle and the second vehicle.

16. The vehicle control device according to claim 15, wherein the value of the positive score is set to be larger as the distance between the first vehicle and the second vehicle is larger, and the value of the negative score is set to be larger as the distance between the first vehicle and the second vehicle is smaller.

17. A vehicle control method, comprising:
controlling, by a computer, a speed of a vehicle such that at least a part of the vehicle is included within a reference range set between a first vehicle and a second vehicle based on a distance between the first vehicle and the second vehicle when a course of the vehicle is to be changed to a lateral side of a current position of the vehicle, the first vehicle being located on the lateral side, the second vehicle being located on the lateral side behind the first vehicle in a longitudinal direction of a road,
performing, by the computer, a score granting processing,
in a first case in which a positive score is equal to or greater than a first threshold, causing, by the computer, the vehicle to move to a space between the first vehicle and the second vehicle,
in a second case in which a negative score is equal to or greater than a second threshold, moving, by the computer, the vehicle to behind the second vehicle, and the negative score and the positive score is associated with an identification information of the second vehicle in a score table recorded on a storage device,
the score granting processing comprising:
granting the positive score to the identification information of the second vehicle in the score table when at least the part of the vehicle is included within the reference range and the distance between the first vehicle and the second vehicle is equal to or greater than a threshold, and
granting the negative score to the identification information of the second vehicle in the score table when at least the part of the vehicle is included within the reference range and the distance between the first vehicle and the second vehicle is shorter than the threshold.

18. A non-transitory computer-readable storage medium that stores a computer program to be executed by a computer to perform at least:
control a speed of a vehicle such that at least a part of the vehicle is included within a reference range set between a first vehicle and a second vehicle based on a distance between the first vehicle and the second vehicle when a course of the vehicle is to be changed to a lateral side of a current location of the vehicle, the first vehicle being located on the lateral side, the second vehicle being located on the lateral side behind the first vehicle in a longitudinal direction of a road,
perform a score granting processing,
in a first case in which a positive score is equal to or greater than a first threshold, cause the vehicle to move to a space between the first vehicle and the second vehicle,
in a second case in which a negative score is equal to or greater than a second threshold, move the vehicle to behind the second vehicle, and
the negative score and the positive score is associated with an identification information of the second vehicle in a score table recorded on a storage device,
the score granting processing comprising:
granting the positive score to the identification information of the second vehicle in the score table when at least the part of the vehicle is included within the reference range and the distance between the first vehicle and the second vehicle is equal to or greater than a threshold, and
granting the negative score to the identification information of the second vehicle in the score table when at least the part of the vehicle is included within the reference range and the distance between the first vehicle and the second vehicle is shorter than the threshold.

* * * * *